United States Patent
O'Leary et al.

(10) Patent No.: US 10,385,718 B2
(45) Date of Patent: Aug. 20, 2019

(54) TURBINE SHROUD SEGMENT WITH SIDE PERIMETER SEAL

(71) Applicant: Rolls-Royce North American Technologies, Inc., Indianapolis, IN (US)

(72) Inventors: Mark O'Leary, Zionsville, IN (US); Daniel K. Vetters, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 463 days.

(21) Appl. No.: 15/175,689

(22) Filed: Jun. 7, 2016

(65) Prior Publication Data

US 2017/0037740 A1    Feb. 9, 2017

Related U.S. Application Data

(63) Continuation-in-part of application No. 15/004,442, filed on Jan. 22, 2016, now Pat. No. 10,047,624, and a continuation-in-part of application No. 15/004,436, filed on Jan. 22, 2016, now Pat. No. 10,184,352, and a continuation-in-part of application No. 15/004,448, filed on Jan. 22, 2016, now Pat. No. 10,196,919, and (Continued)

(51) Int. Cl.
| | |
|---|---|
| *F01D 11/12* | (2006.01) |
| *F01D 11/24* | (2006.01) |
| *F01D 9/02* | (2006.01) |

(52) U.S. Cl.
CPC .............. *F01D 11/12* (2013.01); *F01D 9/02* (2013.01); *F01D 11/24* (2013.01); *F05D 2220/32* (2013.01); *F05D 2240/11* (2013.01); *F05D 2260/52* (2013.01); *F05D 2300/6033* (2013.01); *Y02T 50/672* (2013.01)

(58) Field of Classification Search
CPC ................................. F01D 11/14; F01D 11/22
See application file for complete search history.

(56) References Cited

U.S. PATENT DOCUMENTS

| | | |
|---|---|---|
| 4,573,866 A | 3/1986 | Sandy et al. |
| 6,884,026 B2 | 4/2005 | Glynn et al. |

(Continued)

FOREIGN PATENT DOCUMENTS

| | | |
|---|---|---|
| EP | 2434106 A2 | 3/2012 |
| EP | 2775103 A2 | 9/2014 |

(Continued)

OTHER PUBLICATIONS

Extended European Search Report, European Application No. 16173847.1-1610, dated Dec. 12, 2016, 8 pages.
GE Aviation Jefferies Investor Visit Presentation; May 12, 2014.

*Primary Examiner* — Justin D Seabe
*Assistant Examiner* — Juan G Flores
(74) *Attorney, Agent, or Firm* — Barnes & Thornburg LLP

(57) ABSTRACT

A turbine shroud segment of a turbine shroud for use in a turbine of a gas turbine engine is disclosed herein. The turbine shroud segment includes a carrier segment and a blade track segment. The carrier segment includes metallic materials. The blade track segment includes ceramic matrix composite materials. A seal is arranged between the carrier segment and the blade track segment.

17 Claims, 6 Drawing Sheets

Related U.S. Application Data a continuation-in-part of application No. 15/004,444, filed on Jan. 22, 2016, now Pat. No. 10,094,234.

(60) Provisional application No. 62/186,110, filed on Jun. 29, 2015, provisional application No. 62/186,114, filed on Jun. 29, 2015.

(56) References Cited

U.S. PATENT DOCUMENTS

| | | |
|---|---|---|
| 7,033,138 B2 | 4/2006 | Tomita et al. |
| 7,306,424 B2 | 12/2007 | Romanov et al. |
| 7,726,936 B2 | 6/2010 | Keller et al. |
| 7,950,234 B2 | 5/2011 | Radonovich et al. |
| 8,118,546 B2 | 2/2012 | Morrison |
| 8,128,343 B2 | 3/2012 | Schiavo et al. |
| 8,246,299 B2 | 8/2012 | Razzell et al. |
| 8,459,042 B2 | 6/2013 | Lohmueller |
| 8,534,995 B2 | 9/2013 | McCaffrey |
| 8,740,552 B2 | 6/2014 | Marusko et al. |
| 8,753,073 B2 | 6/2014 | Albers et al. |
| 8,790,067 B2 | 7/2014 | McCaffrey et al. |
| 8,826,668 B2 | 9/2014 | Lee et al. |
| 8,834,105 B2* | 9/2014 | Albers ............ F01D 11/005 415/173.1 |
| 8,905,709 B2 | 12/2014 | Dziech et al. |
| 8,926,270 B2 | 1/2015 | Karafillis et al. |
| 8,932,009 B2 | 1/2015 | Moraines et al. |
| 8,967,972 B2* | 3/2015 | Brandl ............ F01D 5/187 415/173.1 |
| 8,998,572 B2 | 4/2015 | Lutjen et al. |
| 9,874,104 B2* | 1/2018 | Shapiro ............ F01D 25/246 |
| 2008/0206046 A1 | 8/2008 | Razzell et al. |
| 2013/0156550 A1 | 6/2013 | Franks et al. |
| 2014/0023490 A1 | 1/2014 | Hillier |
| 2016/0102572 A1 | 4/2016 | O'Leary |

FOREIGN PATENT DOCUMENTS

| | | |
|---|---|---|
| EP | 2960440 A1 | 12/2015 |
| GB | 2168110 A | 6/1986 |

\* cited by examiner

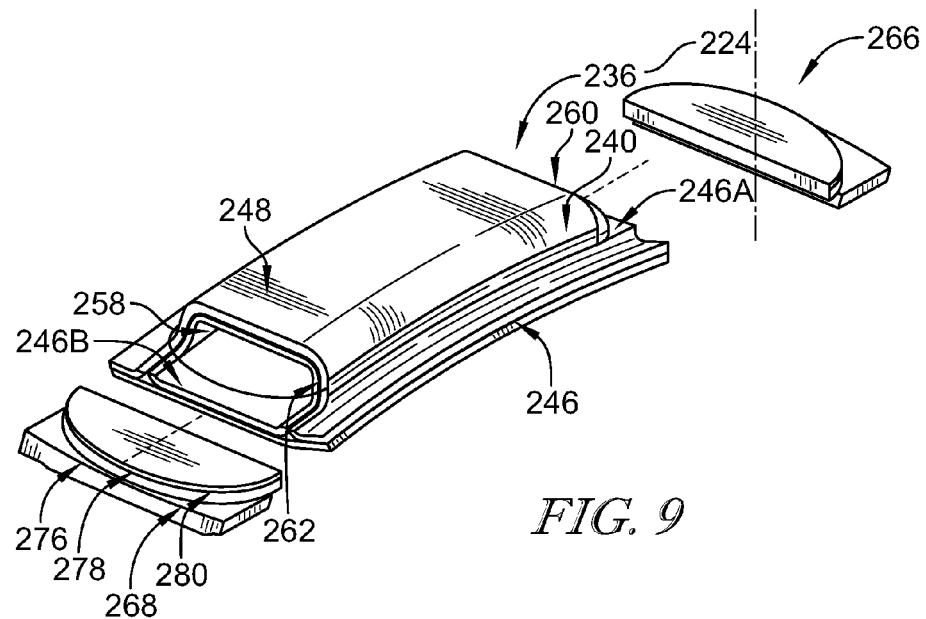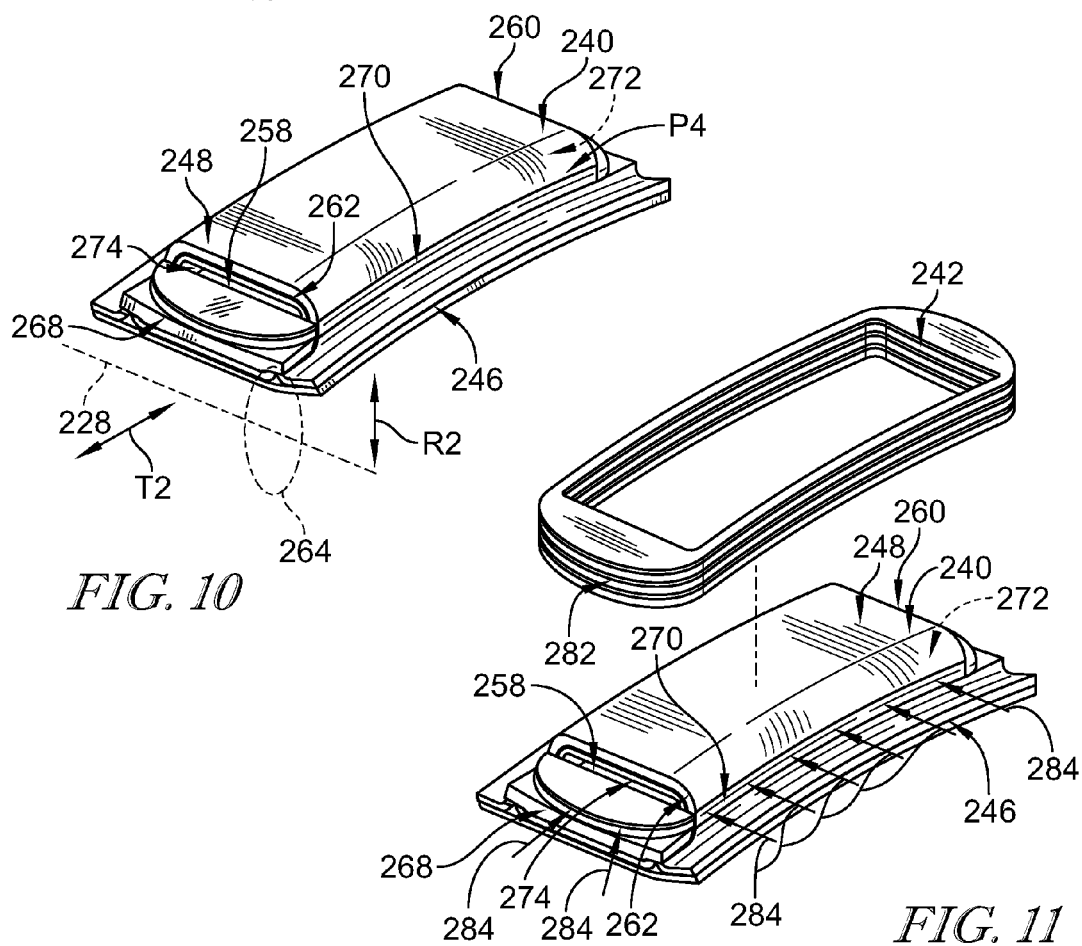

TURBINE SHROUD SEGMENT WITH SIDE PERIMETER SEAL

CROSS REFERENCE TO RELATED APPLICATIONS

This application claims priority to and the benefit of the following, the disclosure of each of which is now expressly incorporated herein by reference: U.S. Provisional Patent Application No. 62/186,110, filed 29 Jun. 2015; U.S. Provisional Patent Application No. 62/186,114, filed 29 Jun. 2015; U.S. patent application Ser. No. 15/004,442, filed 22 Jan. 2016; U.S. patent application Ser. No. 15/004,444, filed 22 Jan. 2016; U.S. patent application Ser. No. 15/004,436, filed 22 Jan. 2016; and U.S. patent application Ser. No. 15/004,448, filed 22 Jan. 2016.

FIELD OF THE DISCLOSURE

The present disclosure relates generally to gas turbine engines, and more specifically to turbine shrouds included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures and high pressures from products of the combustion reaction in the combustor. Such shrouds sometimes include components made from materials, such as ceramic matrix composites materials, having allowable stresses that may constrain exposure of the components to the high temperature and high pressure combustion products.

SUMMARY

The present disclosure may comprise one or more of the following features and combinations thereof.

A turbine shroud segment may include a carrier segment comprising metallic materials, a blade track segment comprising ceramic matrix composite materials, and a seal assembly. The blade track segment may be formed to include a runner shaped to extend partway around a central axis and an attachment box portion that extends radially outward from the runner into an attachment channel formed by the carrier segment.

In illustrative embodiments, the seal assembly may be configured to couple to the carrier segment and the attachment box portion of the blade track segment such that the seal assembly seals between the carrier segment and the blade track segment around a perimeter of the attachment box portion when the seal assembly is coupled to the carrier segment and the attachment box portion. The seal assembly may include at least one unitary component that extends continuously around the perimeter of the attachment box portion.

In illustrative embodiments, the seal assembly may be formed from a plurality of components arranged around the perimeter of the attachment box portion. The seal assembly may include a first seal member and a second seal member. The first seal member may be configured to couple to the carrier segment and the attachment box portion such that the first seal member seals between the carrier segment and the attachment box portion around a first portion of the perimeter of the attachment box portion. The second seal member may be configured to couple to the carrier segment and the attachment box portion such that the second seal member seals between the carrier segment and the attachment box portion around a second portion of the perimeter of the attachment box portion located radially outward of the first portion. At least one of the first seal member and the second seal member may have a generally E-shaped cross section.

In illustrative embodiments, the blade track segment may include end caps that cooperate with the attachment box portion of the blade track segment to form a seal surface onto which the seal assembly is engaged. Each of the end caps may be formed from two separate components. The end caps may comprise metallic materials. The end caps may comprise ceramic matrix composite material and may be integrated with the attachment box portion of the blade track segment by co-processing such that the ceramic matrix composite material bonds the end caps to the attachment box portion.

According to another aspect of the present disclosure, a turbine shroud segment may include a carrier segment comprising metallic materials, a blade track segment comprising ceramic matrix composite materials, and a seal assembly. The carrier segment may be formed to include an attachment channel. The blade track segment may include a runner shaped to extend partway around a central axis, an attachment box portion that extends radially outward from the runner into the attachment channel to define an interior space opening outwardly at opposite ends of the attachment box portion in a direction substantially tangent to a circle extending around the central axis, and end caps engaged with the opposite ends of the attachment box portion to at least partially close off the interior space.

In illustrative embodiments, the seal assembly may be configured to couple to the carrier segment, the attachment box portion, and the end caps such that the seal assembly seals between the carrier segment and the attachment box portion and between the carrier segment and the end caps around a perimeter of the attachment box portion when the seal assembly is coupled to the carrier segment, the attachment box portion, and the end caps. The end caps may be engaged with the opposite ends of the attachment box portion by chemical vapor infiltration or melt infiltration.

In illustrative embodiments, the end caps may be engaged with the opposite ends of the attachment box portion by a biaser that mechanically biases the end caps toward engagement with the opposite ends of the attachment box portion. The biaser may be a spring or a rod.

In illustrative embodiments, the end caps may be engaged with the opposite ends of the attachment box portion to define openings into the interior space at the opposite ends of the attachment box portion.

According to another aspect of the present disclosure, a turbine shroud segment may include a carrier segment comprising metallic materials, a blade track segment comprising ceramic matrix composite materials, a seal assembly, and a pressure control system. The carrier segment may be formed to include an attachment channel. The blade track segment may include a runner shaped to extend partway around a central axis, an attachment box portion that extends radially outward from the runner into the attachment channel to define an interior space opening outwardly at opposite ends of the attachment box portion in a direction substantially tangent to a circle extending around the central axis, and end caps engaged with the opposite ends of the attachment box portion to completely close off the interior space.

In some embodiments, the seal assembly may be configured to couple to the carrier segment, the attachment box portion, and the end caps such that the seal assembly seals between the carrier segment and the attachment box portion and between the carrier segment and the end caps around a perimeter of the attachment box portion when the seal assembly is coupled to the carrier segment, the attachment box portion, and the end caps. The pressure control system may be configured such that pressure of fluid located in the attachment channel outside of the interior space is controlled independently of pressure of fluid located inside the interior space to adjust the pressure load experienced by the blade track segment during operation of the turbine shroud segment.

In illustrative embodiments, the end caps may comprise metallic materials. The end caps may comprise ceramic matrix composite material. The attachment box portion and the end caps may interface to cooperatively provide a smooth sealing surface that extends continuously around the perimeter of the attachment box portion and is configured to engage the seal assembly.

In illustrative embodiments, sealing loads may be applied substantially perpendicular to the sealing surface by the seal assembly to generally place the blade track segment in compression and reduce torsion of the runner about the central axis when the seal assembly is coupled to the carrier segment, the attachment box portion, and the end caps.

These and other features of the present disclosure will become more apparent from the following description of the illustrative embodiments.

BRIEF DESCRIPTION OF THE DRAWINGS

FIG. 9 is an exploded perspective view of yet another turbine shroud segment adapted for use in the turbine section of FIG. 1 showing that that the turbine shroud segment includes a blade track segment or seal ring segment having a runner, an attachment box portion extending radially outward away from the runner to define an interior space, and end caps configured to engage the attachment box portion and interface with the runner;

FIG. 10 is a perspective view of the turbine shroud segment of FIG. 9 showing that the end caps are engaged with opposite ends of the attachment box portion to assemble the turbine shroud segment and partially close off the interior space;

FIG. 11 is a partially exploded perspective view of the turbine shroud segment of FIG. 9 showing that the turbine shroud segment includes a seal assembly having a unitary component that extends continuously around a perimeter of the attachment box portion, the end caps and the attachment box portion cooperate to provide a sealing surface configured to engage the seal assembly, and the seal assembly is configured to apply sealing loads substantially perpendicular to the sealing surface when the seal assembly is engaged with the sealing surface.

DETAILED DESCRIPTION

Figure 1:
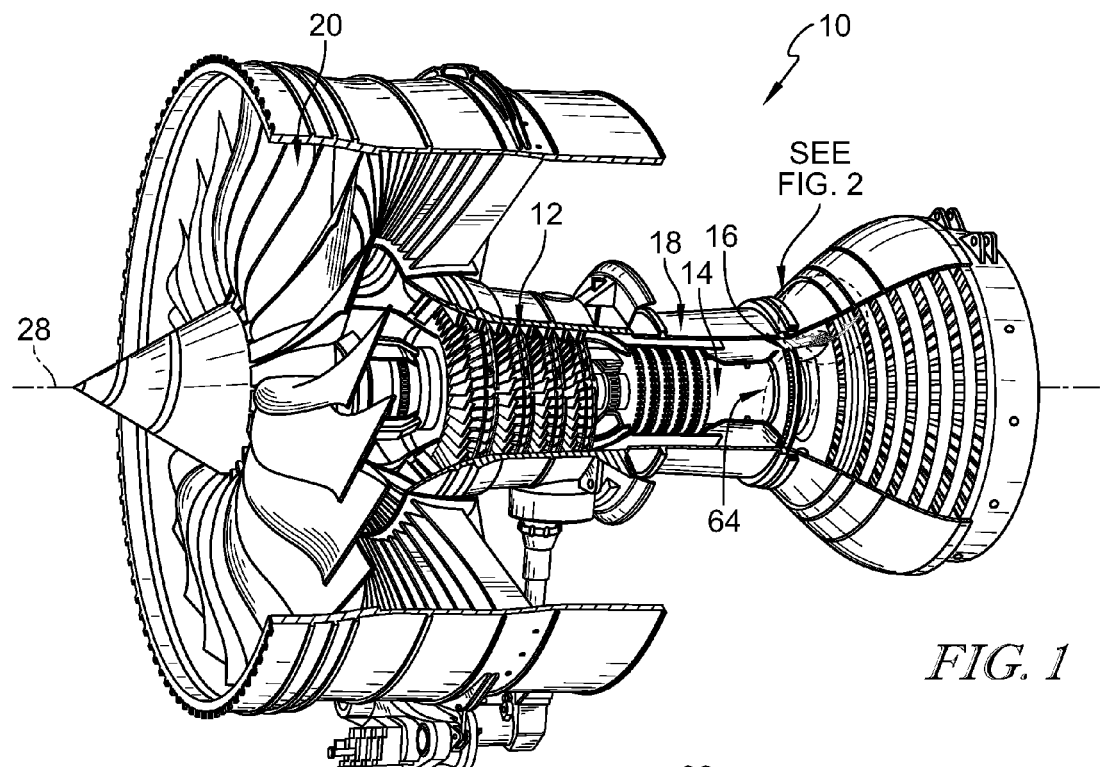
FIG. 1 is a cut-away perspective view of a gas turbine engine showing that the gas turbine engine includes a turbine section.

For the purposes of promoting an understanding of the principles of the disclosure, reference will now be made to a number of illustrative embodiments illustrated in the drawings and specific language will be used to describe the same.

Referring now to FIG. 1, an illustrative gas turbine engine 10 includes a compressor 12, a combustor 14, and a turbine 16 mounted to and supported by a case 18. The compressor 12 compresses and delivers air to the combustor 14. The combustor 14 mixes fuel with the compressed air received from the compressor 12 and ignites the air-fuel mixture. The hot, high-pressure products of the combustion reaction in the combustor 14 are directed into the turbine 16 and the turbine 16 extracts work to drive the compressor 12 and a fan 20 included in the engine 10.

Figure 2:
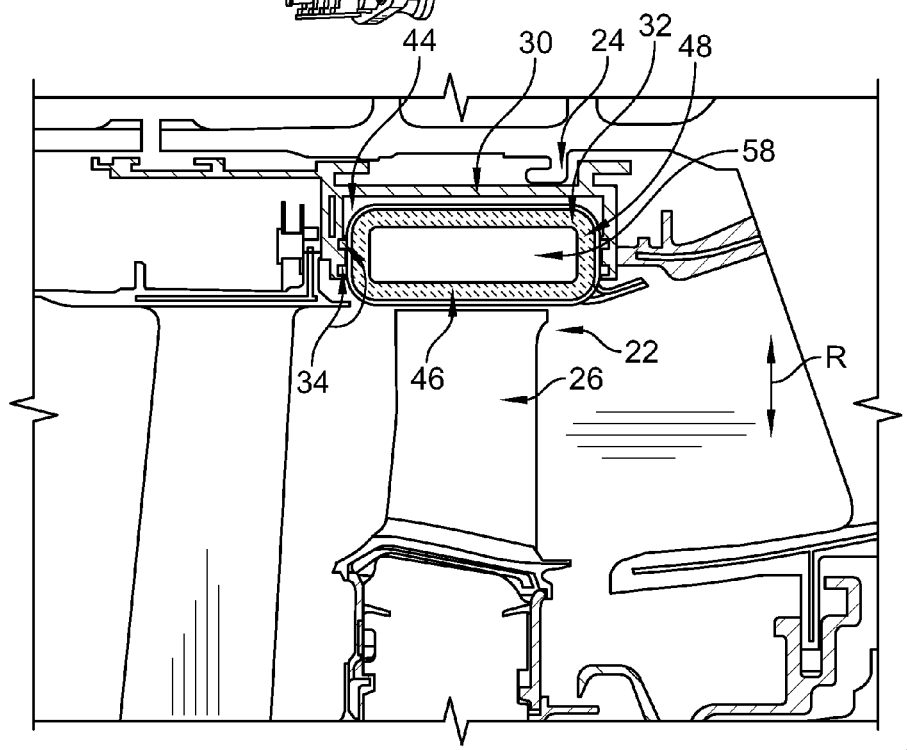
FIG. 2 is a partial cross-sectional view of the turbine section of FIG. 1 showing that the turbine section includes a turbine shroud that extends around a turbine wheel assembly to block gasses from passing over the turbine wheel assembly during use in the gas turbine engine.
Figure 3:
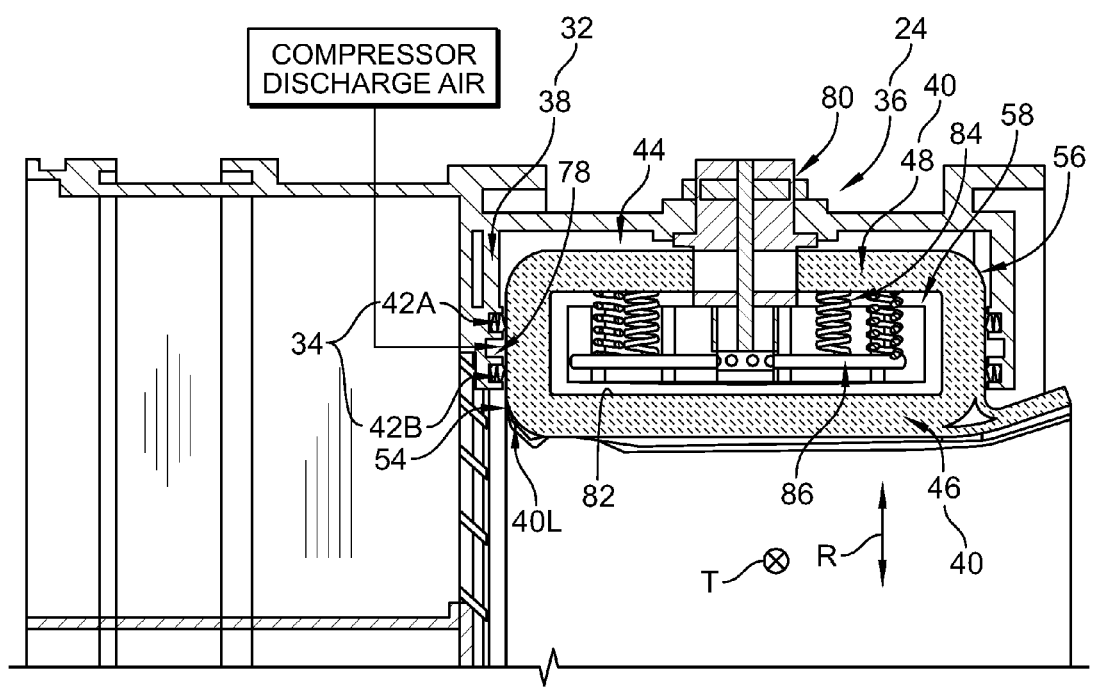
FIG. 3 is a cut-away view of a turbine shroud segment included in the turbine shroud of FIG. 2 showing that the turbine shroud segment includes a metallic carrier segment, a blade track segment or seal ring segment nested in the carrier segment and having a runner and an attachment box portion extending radially outward away from the runner, and a seal assembly arranged between the carrier segment and the blade track segment that engages the carrier segment and perimeter sides of the attachment box portion.

Referring now to FIGS. 2 and 3, the turbine 16 illustratively includes a turbine wheel assembly 22 and a turbine shroud 24. The turbine wheel assembly 22 has blades 26 that are pushed by the combustion products from the combustor 14 to cause the assembly 22 to rotate about a central axis 28. The turbine shroud 24 extends around the central axis 28 to block combustion products from passing over the blades 26 without pushing the blades 26 to cause the assembly 22 to rotate. Combustion products that are allowed to pass over the blades 26 do not push the blades 26, and such passed-over products contribute to lost performance within the engine 10.

The turbine shroud 24 illustratively includes a carrier 30, a blade track 32 coupled to the carrier 30, and a seal system 34 coupled to the carrier 30 and the blade track 32 as shown in FIGS. 2 and 3. The carrier 30 illustratively includes metallic materials and is adapted to couple to the case 18. The blade track 32 illustratively includes ceramic matrix composite materials and is nested in the carrier 30. The seal system 34 illustratively includes metallic materials and is adapted to be arranged between the carrier 30 and the blade track 32 to seal around the perimeter of the blade track 32 to control pressure loads applied to the blade track 32 during operation of the gas turbine engine 10.

The turbine shroud 24 illustratively includes turbine shroud segments 36 that are circumferentially arranged around the central axis 28 to form the turbine shroud 24 as shown in FIGS. 2 and 3. Each turbine shroud segment 36 includes a carrier segment 38 (i.e., a segment of the carrier 30), a blade track segment 40 (i.e., a segment of the blade track 32), and a seal assembly 42 (making up a portion of the seal system 34).

The carrier segment 38 illustratively includes an attachment channel 44 and the blade track segment 40 illustratively includes a runner 46 and an attachment box portion 48 as shown in FIGS. 2 and 3. The runner 46 is shaped to extend partway around the central axis 28 and the attachment box portion 48 extends outward in a radial direction indicated by arrow R from the runner 46 into the attachment channel 44. The seal assembly 42 is configured to couple to the carrier segment 38 and the attachment box portion 48 such that the seal assembly 42 seals between the carrier segment 38 and the blade track segment 40. More specifically, when the seal assembly 42 is coupled to the carrier segment 38 and the attachment box portion 48, the seal assembly 42 seals between the segments 38, 40 around a perimeter P of the attachment box portion 48.

Figure 4:
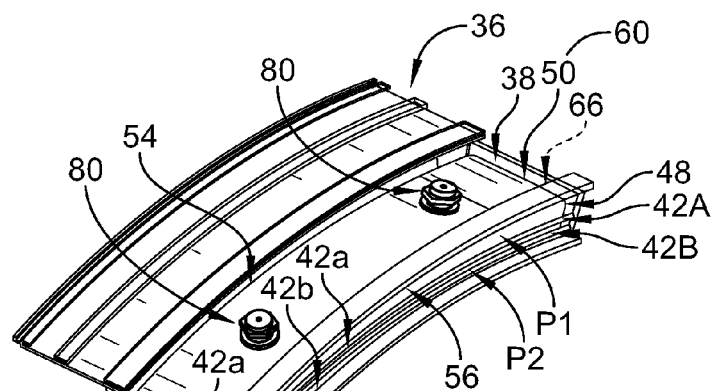
FIG. 4 is a perspective view of the turbine shroud segment of FIG. 3 showing that the seal assembly includes first and second seal members that each seal between the carrier segment and the blade track segment around the perimeter of the attachment box portion and that the first and second seal members are radially spaced apart from each other.

The seal assembly 42 seals between the carrier and blade track segments 38, 40 around sides 50, 52, 54, 56 of the attachment box portion portion 48 that define the perimeter P as shown in FIG. 4. The sides 50, 52 are arranged opposite one another and extend along the central axis 28. The sides 54, 56 are arranged opposite one another and extend between the sides 50, 52.

The illustrative arrangement of the seal assembly 42 around the sides 50, 52, 54, 56 of the attachment box portion 48 as shown in FIG. 4 can reduce a load applied by the seal assembly 42 to the runner 46. That is, because the seal assembly 42 is arranged radially outward of the runner 46, the seal assembly 42 can apply a smaller load to the runner 46 than would be the case if the seal assembly 42 directly contacted the runner 46. Additionally, the illustrative arrangement of the seal assembly 42 around the perimeter P of the portion 48 may apply sealing loads to the blade track segment 40 to generally place the segment 40 in compression. As a result, that arrangement may reduce torsion of the runner 46 about the central axis 28 to a greater degree than would be the case if other loads were applied by the seal assembly 42 to the blade track segment 40.

The attachment box portion 48 of the blade track segment 40 illustratively extends radially outward from the runner 46 of the segment 40 to define an interior space 58 as shown in FIG. 3. The interior space 58 opens outwardly at opposite ends 60, 62 of the respective sides 50, 52 of the portion 48 in a tangential direction indicated by mark T. The tangential direction T is substantially tangent to a circle 64 extending around the central axis 28.

In addition to the runner 46 and the attachment box portion 48, the blade track segment 40 illustratively includes substantially identical end caps 66, 68 as shown in FIG. 4. The end caps 66, 68 are engaged with the respective circumferential ends 60, 62 of the attachment box portion 48 to, in cooperation with gaskets 70 in some embodiments, close off the interior space 58. When the seal assembly 42 is engaged with the carrier segment 38, the box attachment portion 48, and the end caps 66, 68, closure of the interior space 58 permits fluid pressure inside the space 58 to be controlled independently of fluid pressure outside the space 58 in a cavity 72. As a result, the pressure load experienced by the blade track segment 40 may be adjusted during operation of the gas turbine engine 10.

The blade track segment 40 and the seal assembly 42 illustratively cooperate to completely, or at least substantially, close off the attachment channel 44 as shown in FIG. 3. As a result, the cavity 72 is defined between the carrier segment 38 and the blade track segment 40. To adjust the pressure load experienced by the blade track segment 40 and/or cool the segment 40 during operation of the turbine shroud segment 36, the cavity 72 may be pressurized. Such pressurization is described in U.S. patent application Ser. No. 15/004,444.

Pressurization inside the interior space 58 is controlled independently of pressurization inside the cavity 72 as indicated above and shown in FIG. 3. The carrier and blade track segments 38, 40 and the seal assembly 42 may therefore be said to cooperatively provide a pressure control system 74 of the turbine shroud segment 36. The pressure control system 74 is configured such that fluid pressure inside the cavity 72 is controlled independently of fluid pressure inside the interior space 58 to adjust the pressure load experienced by the blade track segment 40 during operation of the engine 10. As a result, the pressure control system 74 manages the pressure load experienced by the segment 40 such that the load is below the allowable load of the ceramic matrix composite materials.

The seal assembly 42 illustratively includes substantially identical seal members 42A and 42B as shown in FIG. 3. The seal member 42A is engaged with the carrier segment 38, the attachment box portion 48, and the end caps 66, 68 to close off or seal the attachment channel 44 to form the cavity 72. The seal member 42B is engaged with the carrier segment 38, the attachment box portion 48, and the end caps 66, 68 and located radially inward of the seal member 42A relative to the central axis 28. As a result, the seal member 42B is positioned closer to the combustion products directed to a leading edge 40L of the segment 40 than the seal member 42A.

Figure 5:
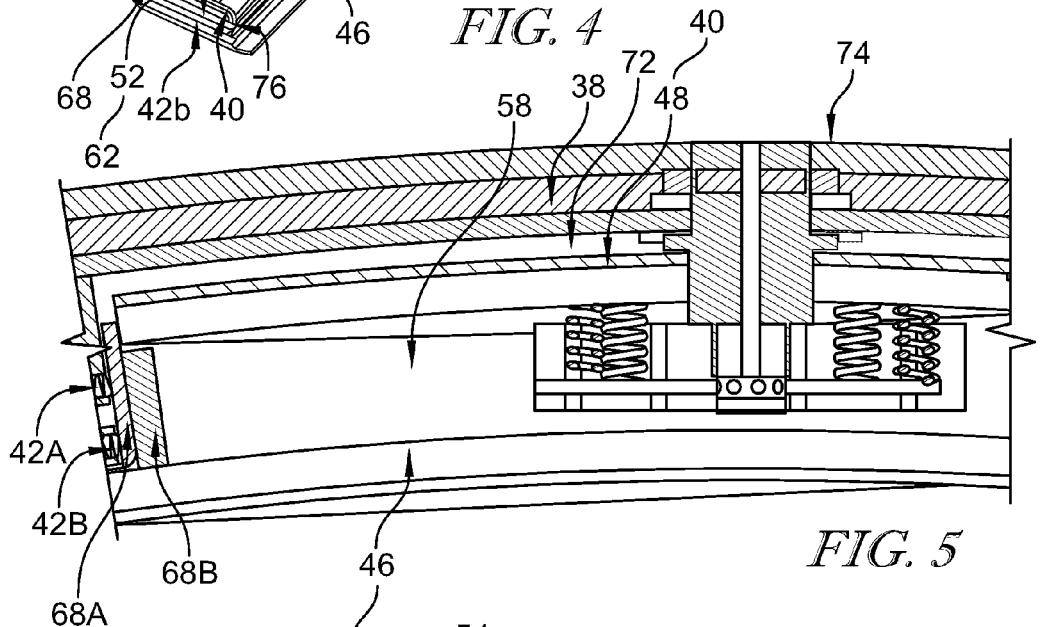
FIG. 5 is a partial cross-sectional front elevation view of the turbine shroud segment of FIG. 4 showing that the attachment box portion defines an interior space and suggesting that the blade track segment includes a pair of end caps that are engaged with opposite ends of the attachment box portion to completely close off the interior space to permit fluid pressure inside the interior space to be controlled independently of fluid pressure outside the interior space to adjust the pressure load experienced by the blade track segment during use in the gas turbine engine.

The seal members 42A, 42B are illustratively embodied as, or otherwise include, metallic structures having generally E-shaped cross sections as shown in FIGS. 3 and 5. In other embodiments, however, the seal members 42A, 42B may have another suitable construction and another suitable cross sectional shape.

The seal member 42A illustratively seals between the carrier segment 38 and the attachment box portion 48 and between the segment 38 and the end caps 66, 68 around a portion P1 of the perimeter P of the attachment box portion 48 as shown in FIG. 4. The seal member 42B illustratively seals between the carrier segment 38 and the attachment box portion 48 and between the segment 38 and the end caps 66, 68 around a portion P2 of the perimeter P. Because the seal member 42B is located radially inward of the seal member 42A relative to the central axis 28, the portion P2 is located radially inward of the portion P1 relative to the axis 28.

Referring now to FIG. 4, the seal member 42A is illustratively formed from seal member components 42a. The seal member components 42a are embodied as, or otherwise include, generally straight components that are separate from one another and arranged around the portion P1 of the perimeter P. The components 42a engage the sides 54, 56 and the end caps 66, 68 and interface with each other at corners 76 that interconnect one of the sides 54, 56 and one of the end caps 66, 68. Specifically, the components 42a interface with each other at the corners 76 such that the components 42a may be said to be butt-ended to each other at the corners 76.

The seal member 42B is illustratively formed from seal member components 42b as shown in FIG. 4. The seal member components 42b are embodied as, or otherwise include, generally straight components that are separate from one another and arranged around the portion P2 of the perimeter P. The components 42b engage the sides 54, 56 and the end caps 66, 68 and interface with each other at the corners 76. Specifically, the components 42b interface with each other at the corners 76 such that the components 42b may be said to be butt-ended to each other at the corners 76.

Referring back to FIG. 3, in some embodiments, the carrier segment 38 may be formed to include a groove 78 that is located radially between the seal members 42A, 42B. The groove 78 may be pressurized by air, such as air discharged by the compressor 12, at a higher pressure than the pressure of the combustion products directed to the leading edge 40L of the segment 40. In the event that the seal member 42B fails, the pressurized groove 78 and the seal member 42A may cooperatively resist migration of the combustion products directed to the leading edge 40L into the cavity 72. As such, the groove 78 may be embodied as, or otherwise include, a buffer groove included in a buffer air seal system such as that described in U.S. patent application Ser. No. 15/004,444.

In some embodiments, the turbine shroud segment 36 may include at least one track-segment coupler or attachment assembly 80 shown in FIGS. 3 and 4. The track-segment coupler 80 may be configured to secure the blade track segment 40 to the carrier segment 38. Additionally, the track-segment coupler 80 may be configured to direct cooling air onto a radially-outward facing surface 82 of the blade track segment 40 to cool the segment 40 and pressurize the interior space 58 during operation of the turbine shroud segment 36. As such, the track-segment coupler 80 may be similar to the track-segment coupler described in U.S. patent application Ser. No. 15/004,436.

In some embodiments, the turbine shroud segment 36 may include at least one track biaser 84 shown in FIG. 3. The track biaser 84 may be urged by a flow distributor 86 included in the track-segment coupler 80 to bias the blade track segment 40 toward the carrier segment 38. Additionally, the track biaser 84 may be configured to maintain engagement of the blade track segment 40 and the carrier segment 38 with the seal assembly 42 during operation of the engine 10. As such, the track biaser 84 may be similar to the track biaser described in U.S. patent application Ser. No. 15/004,448.

Referring now to FIG. 5, the end cap 68 is shown in detail. Because the end caps 66, 68 are substantially identical to one another, only the end cap 68 will be discussed in greater detail below. Additionally, because the end caps 66, 68 may be attached to, or otherwise integrated with, the attachment box portion 48 in substantially identical fashion, only attachment of the end cap 68 to the end 62, or integration of the end cap 68 with the end 62, is discussed in greater detail below.

In the illustrative embodiment, the end cap 68 includes ceramic matrix composite materials. In other embodiments, however, the end cap 68 may include other suitable materials or have another suitable construction. For example, in some embodiments, the end cap 68 may include metallic materials.

The end cap 68 is illustratively formed from two separate components 68A, 68B that are secured together as shown in FIG. 5. In some embodiments, the generally planar components 68A, 68B may be mechanically coupled to one another following production of the attachment box portion 48 of the blade track segment 40. In other embodiments, the components 68A, 68B may be bonded to one another during production of the attachment box portion 48.

In some embodiments, the end cap 68 including ceramic matrix composite materials may be integrated with the end 62 of the attachment box portion 48 during production of the portion 48. The end cap 68 may be integrated with the end 62 by co-processing such that the ceramic matrix composite material bonds the end cap 68 to the end 62. In one example, the end cap 68 may be integrated with the end 62 by a chemical vapor infiltration (CVI) process. In another example, the end cap 68 may be integrated with the end 62 by a melt infiltration (MI) process.

Figure 6:
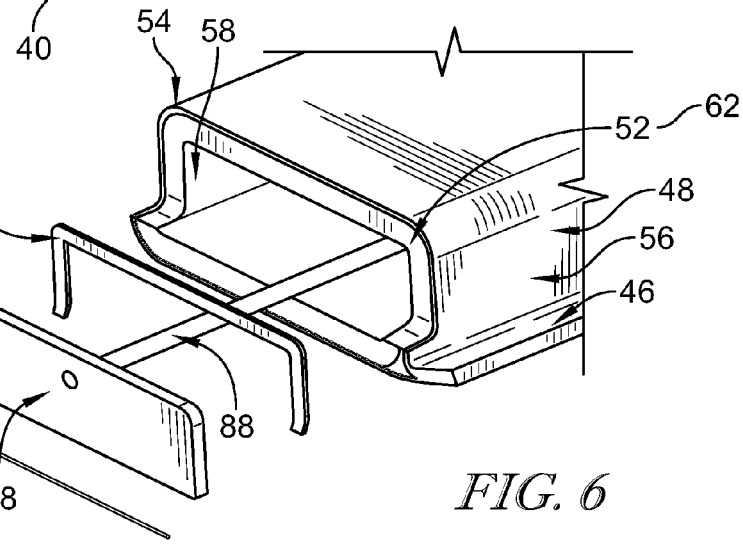
FIG. 6 is an exploded perspective view of the turbine shroud segment of FIG. 4 showing that the end caps may be coupled to the attachment box portion by mechanical means.

Referring now to FIG. 6, in some embodiments, the end cap 68 may be attached to the end 62 of the attachment box portion 48 following production of the portion 48. The end cap 68 may be attached to the end 62 by a biaser 88 that mechanically biases the end cap 68 toward engagement with the end 62. The biaser 88 may be embodied as, or otherwise include, a rod, a spring, or the like.

Figure 7:
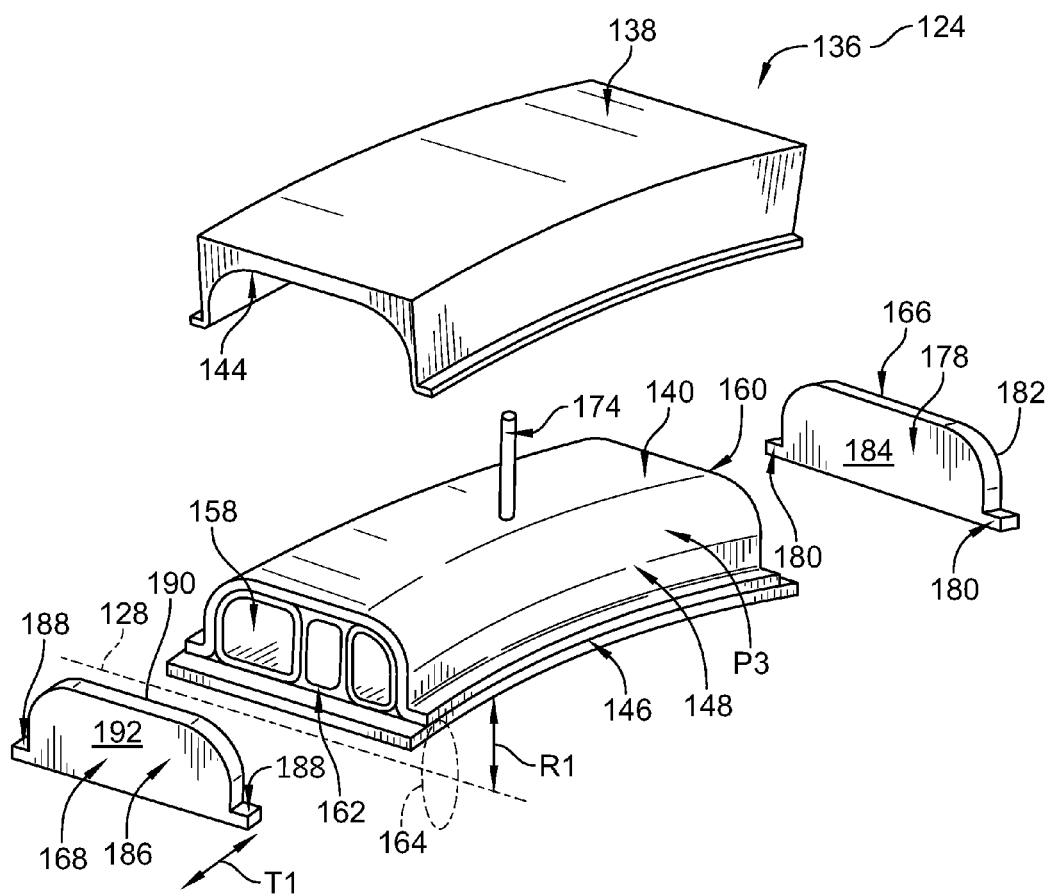
FIG. 7 is an exploded perspective view of another turbine shroud segment adapted for use in the turbine section of FIG. 1 showing that the turbine shroud segment includes a metallic carrier segment and a blade track segment or seal ring segment having a runner, an attachment box portion extending radially outward away from the runner to define an interior space, and end caps configured to engage the attachment box portion.
Figure 8:
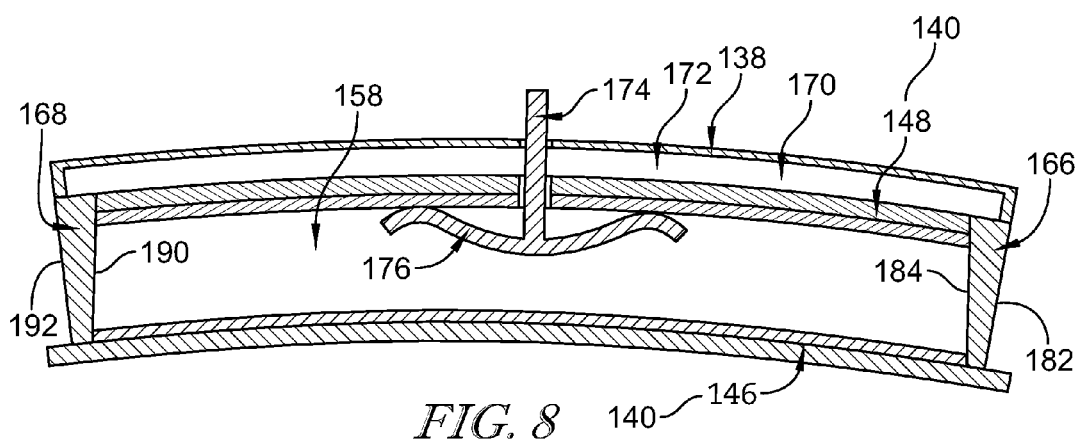
FIG. 8 is a partial front elevation view of the turbine shroud segment of FIG. 7 showing that the end caps are engaged with opposite ends of the attachment box portion to completely close off the interior space.

Referring now to FIGS. 7 and 8, an illustrative turbine shroud segment 136 of a turbine shroud 124 is adapted for use in the turbine 16 of the engine 10. The turbine shroud segment 136 includes a carrier segment 138, a blade track segment 140, and a seal assembly (not shown). The carrier segment 138 illustratively includes metallic materials and the blade track segment 140 illustratively includes ceramic matrix composite materials. The seal assembly may include ceramic matrix composite materials and/or metallic materials. The seal assembly may be substantially similar to the seal assembly 42 discussed above.

The carrier segment 138 illustratively includes an attachment channel 144 and the blade track segment 140 illustratively includes a runner 146 and an attachment box portion 148 as shown in FIGS. 7 and 8. The runner 146 is shaped to extend partway around a central axis 128 and the attachment box portion 148 extends outward in a radial direction indicated by arrow R1 from the runner 146 toward the attachment channel 144. The seal assembly may be configured to couple to the carrier segment 138 and the attachment box portion 148 such that the seal assembly seals between the carrier segment 138 and the blade track segment 140. When the seal assembly is coupled to the carrier segment 138 and the attachment box portion 148, the seal assembly may seal between the segments 138, 140 around a perimeter P3 of the attachment box portion 148.

The arrangement of the seal assembly around the perimeter P3 of the attachment box portion 148 can reduce a load applied by the seal assembly to the runner 146. That is, because the seal assembly may be arranged radially outward of the runner 146, the seal assembly can apply a smaller load to the runner 146 than might be the case if the seal assembly directly contacted the runner 146. Additionally, the arrangement of the seal assembly around the perimeter P3 may apply sealing loads to the blade track segment 140 to generally place the segment 140 in compression. As a result, that arrangement may reduce torsion of the runner 146 about the central axis 128 to a greater degree than might be the case if other loads were applied by the seal assembly to the blade track segment 140.

The attachment box portion 148 of the blade track segment 140 illustratively extends radially outward from the runner 146 of the segment 140 to define an interior space 158 as shown in FIG. 7. The interior space 158 opens outwardly at opposite circumferential ends 160, 162 of the portion 148 in a tangential direction indicated by arrow T1. The tangential direction T1 is substantially tangent to a circle 164 extending around the central axis 128.

In addition to the runner 146 and the attachment box portion 148, the blade track segment 140 illustratively includes substantially identical end caps 166, 168 as shown in FIGS. 7 and 8. The end caps 166, 168 are engaged with the respective ends 160, 162 of the attachment box portion 148 to close off the interior space 158. When the seal assembly is engaged with the carrier segment 138, the attachment box portion 148, and the end caps 166, 168, closure of the interior space 158 may permit fluid pressure inside the space 158 to be controlled independently of fluid pressure outside the space 158 in a cavity 170. As a result, the pressure load experienced by the blade track segment 140 may be adjusted during operation of the gas turbine engine 10.

In some embodiments, the blade track segment 140 and the seal assembly may cooperate to completely, or at least substantially, close off the attachment channel 144 as suggested by FIGS. 7 and 8. As a result, a cavity 170 may be defined between the carrier segment 138 and the blade track segment 140. To adjust the pressure load experienced by the blade track segment 140 and/or cool the segment 140 during operation of the turbine shroud segment 136, the cavity 170 may be pressurized.

Pressurization inside the interior space 158 may be controlled independently of pressurization inside the cavity 170 as indicated above and suggested by FIG. 8. The carrier and blade track segments 138, 140 and the seal assembly may therefore be said to cooperatively provide a pressure control system 172. The pressure control system 172 may be configured such that fluid pressure inside the cavity 170 is controlled independently of fluid pressure inside the interior space 158 to adjust the pressure load experienced by the blade track segment 140 during operation of the engine 10. As a result, the pressure control system 172 may manage the pressure load experienced by the segment 140 such that the load is below the allowable load of the ceramic matrix composite materials.

In some embodiments, the turbine shroud segment 136 may include at least one track-segment coupler 174 shown in FIGS. 7 and 8. The track-segment coupler 174 may be configured to secure the blade track segment 140 to the carrier segment 138.

In some embodiments, the turbine shroud segment 136 may include at least one track biaser 176 shown in FIG. 8. The track biaser 176 may be configured to bias the blade track segment 140 toward the carrier segment 138 to maintain engagement of the segments 138, 140 with the seal assembly during operation of the engine 10.

In the illustrative embodiment, the end caps 166, 168 include ceramic matrix composite materials. In other embodiments, however, the end caps 166, 168 may include other suitable materials or have another suitable construction. For example, in some embodiments, the end caps 166, 168 may include metallic materials.

The end cap 166 illustratively includes a body 178 and legs 180 coupled to the body 178 opposite one another and extending outwardly from the body 178 away from one another as shown in FIG. 7. The body 178 and the legs 180 cooperate to provide faces 182, 184 arranged opposite one another and extending radially at an angle to one another. The face 182 faces outwardly away from the interior space 158 when the face 184 is engaged with the end 160 of the attachment box portion 148. The face 184 is configured to directly contact the end 160 of the attachment box portion 148 to close off the interior space 158.

The end cap 168 illustratively includes a body 186 and legs 188 coupled to the body 186 opposite one another and extending outwardly from the body 186 away from one another as shown in FIG. 7. The body 186 and the legs 188 cooperate to provide faces 190, 192 arranged opposite one another and extending radially at an angle to one another. The face 190 is configured to directly contact the end 162 of the attachment box portion 148 to close off the interior space 158. The face 192 faces outwardly away from the interior space 158 when the face 190 is engaged with the end 162 of the attachment box portion 148.

In the illustrative embodiment, the attachment box portion 148 of the blade track segment 140 and the end caps 166, 168 of the segment 140 are constructed by means of ply layups. In other embodiments, however, the attachment box portion 148 and the end caps 166, 168 may be constructed by means of 3D weave technology.

In the illustrative embodiment, the end caps 166, 168 of the blade track segment 140 are constructed separately from the attachment box portion 148 of the segment 140 as suggested by FIGS. 7 and 8. The end caps 166, 168 are engaged with the ends 160, 162 of the attachment box portion 148 subsequent to constructing the portion 148 to form the blade track segment 140. Separate construction of the attachment box portion 148 and the end caps 166, 168 may provide a 3D ceramic matrix composite structure having a more desirable geometry than might be the case if the portion 148 and the end caps 166, 168 were integrally formed.

Referring now to FIGS. 9-11, an illustrative turbine shroud segment 236 of a turbine shroud 224 is adapted for use in the turbine 16 of the engine 10. The turbine shroud segment 236 includes a carrier segment (not shown), a blade track segment 240, and a seal assembly 242. The blade track segment 240 illustratively includes ceramic matrix composite materials. The seal assembly 242 illustratively includes metallic materials.

The carrier segment may be formed to include an attachment channel and the blade track segment 240 illustratively includes a runner 246 and an attachment box portion 248 as shown in FIG. 9. The runner 246 is shaped to extend partway around a central axis 228 and the attachment box portion 248 may extend outward in a radial direction indicated by arrow R2 from the runner 246 toward the attachment channel. The seal assembly 242 is configured to couple to the carrier segment and the attachment box portion 248 such that the seal assembly 242 seals between the carrier segment and the blade track segment 240. When the seal assembly 242 is coupled to the carrier segment and the attachment box portion 248, the seal assembly 242 seals between the carrier segment and the segment 240 around a perimeter P4 of the attachment box portion 248.

The illustrative arrangement of the seal assembly 242 around the perimeter P4 of the attachment box portion 248 as shown in FIG. 11 can reduce a load applied by the seal assembly 242 to the runner 246. That is, because the seal assembly 242 is arranged radially outward of the runner 246, the seal assembly 242 can apply a smaller load to the runner 246 than would be the case if the seal assembly 242 directly contacted the runner 246.

The attachment box portion 248 of the blade track segment 240 illustratively extends radially outward from the runner 246 of the segment 240 to define an interior space 258 as shown in FIG. 9. The interior space 258 opens outwardly at opposite circumferential ends 260, 262 of the portion 248 in a tangential direction indicated by arrow T2. The tangential direction T2 is substantially tangent to a circle 264 extending around the central axis 228.

The runner 246 of the blade track segment 240 is illustratively formed to include slots 246A, 246B that are arranged opposite one another as shown in FIG. 9. The slot 246A extends in the tangential direction T2 away from the end 260 of the attachment box portion 248. The slot 246B extends in the tangential direction T2 away from the end 262 of the attachment box portion 248.

In addition to the runner 246 and the attachment box portion 248, the blade track segment 240 illustratively includes substantially identical end caps 266, 268 as shown in FIG. 9. The end caps 266, 268 are sized to be received by the respective slots 246A, 246B so that the end caps 266, 268 engage the respective ends 260, 262 of the attachment box portion 248 as shown in FIG. 10. When the end caps 266, 268 are engaged with the ends 260, 262, the attachment box portion 248 and the end caps 266, 268 interface to cooperatively provide a smooth sealing surface 270. The sealing surface 270 extends continuously around the perimeter P4 of the attachment box portion 248 and is configured to engage the seal assembly 242.

In the illustrative embodiment, the end caps 266, 268 are engaged with the respective ends 260, 262 of the attachment box portion 248 to partially close off the interior space 258 as suggested by FIGS. 10 and 11. As such, when the end caps 266, 268 are engaged with the ends 260, 262, respective openings 272, 274 into the interior space 258 are defined at the ends 260, 262.

In other embodiments, however, the end caps 266, 268 may be engaged with the respective ends 260, 262 of the attachment box portion 248 to completely close off the interior space 258. In such embodiments, complete closure of the interior space 258 may permit fluid pressure inside the space 258 to be controlled independently of fluid pressure outside the space 258. In those embodiments, the carrier segment, the blade track segment 240, and the seal assembly 242 may provide a pressure control system configured to adjust the pressure load experienced by the blade track segment 240 during operation of the engine 10.

In the illustrative embodiment, the end caps 266, 268 include ceramic matrix composite materials. In other embodiments, however, the end caps 266, 268 may include other suitable materials or have another suitable construction. For example, in some embodiments, the end caps 266, 268 may include metallic materials.

The end cap 268 illustratively includes a base 276 and a pedestal 278 interconnected with the base 276 and extending radially outward therefrom as shown in FIG. 9. The base 276 is configured to be received by the slot 246B such that the base 276 interfaces with the runner 246 when the base 276 is received by the slot 246B. The pedestal 278 is configured to engage the end 262 of the attachment box portion 248 such that an arcuate surface 280 of the pedestal 278 partially defines the sealing surface 270 when the pedestal 278 is engaged with the end 262. The opening 274 extends radially between the pedestal 278 and the attachment box portion 248 when the pedestal 278 is engaged with the end 262.

In the illustrative embodiment, the attachment box portion 248 of the blade track segment 240 and the end caps 266, 268 of the segment 240 are constructed by means of ply layups. In other embodiments, however, the attachment box portion 248 and the end caps 266, 268 may be constructed by means of 3D weave technology.

In the illustrative embodiment, the end caps 266, 268 of the blade track segment 240 are constructed separately from the attachment box portion 248 of the segment 240 as suggested by FIG. 9. The end caps 266, 268 are engaged with the ends 260, 262 of the attachment box portion 248 subsequent to constructing the portion 248 to form the blade track segment 240. Separate construction of the attachment box portion 248 and the end caps 266, 268 may provide a 3D ceramic matrix composite structure having a more desirable geometry than might be the case if the portion 248 and the end caps 266, 268 were integrally formed.

The seal assembly 242 is illustratively configured to engage the sealing surface 270 as indicated above and shown in FIG. 11. The seal assembly 242 illustratively includes at least one unitary component 282 that extends continuously around the perimeter P4 of the attachment box portion 248 when the seal assembly 242 is engaged with the surface 270. The seal assembly 242 may therefore be said to be a racetrack seal assembly.

In the illustrative embodiment, the seal assembly 242 includes metallic materials. In other embodiments, however, the seal assembly 242 may include ceramic matrix composite materials.

In the illustrative embodiment, sealing loads indicated by arrows 284 are applied by the seal assembly 242 to the sealing surface 270 when the assembly 242 is engaged with the surface 270 as suggested by FIG. 11. The sealing loads indicated by arrows 284 are applied by the seal assembly 242 substantially perpendicular to the sealing surface 270. As a result, the sealing loads generally place the blade track segment 240 in compression and reduce torsion of the runner 246 about the central axis 228.

Figure 12:
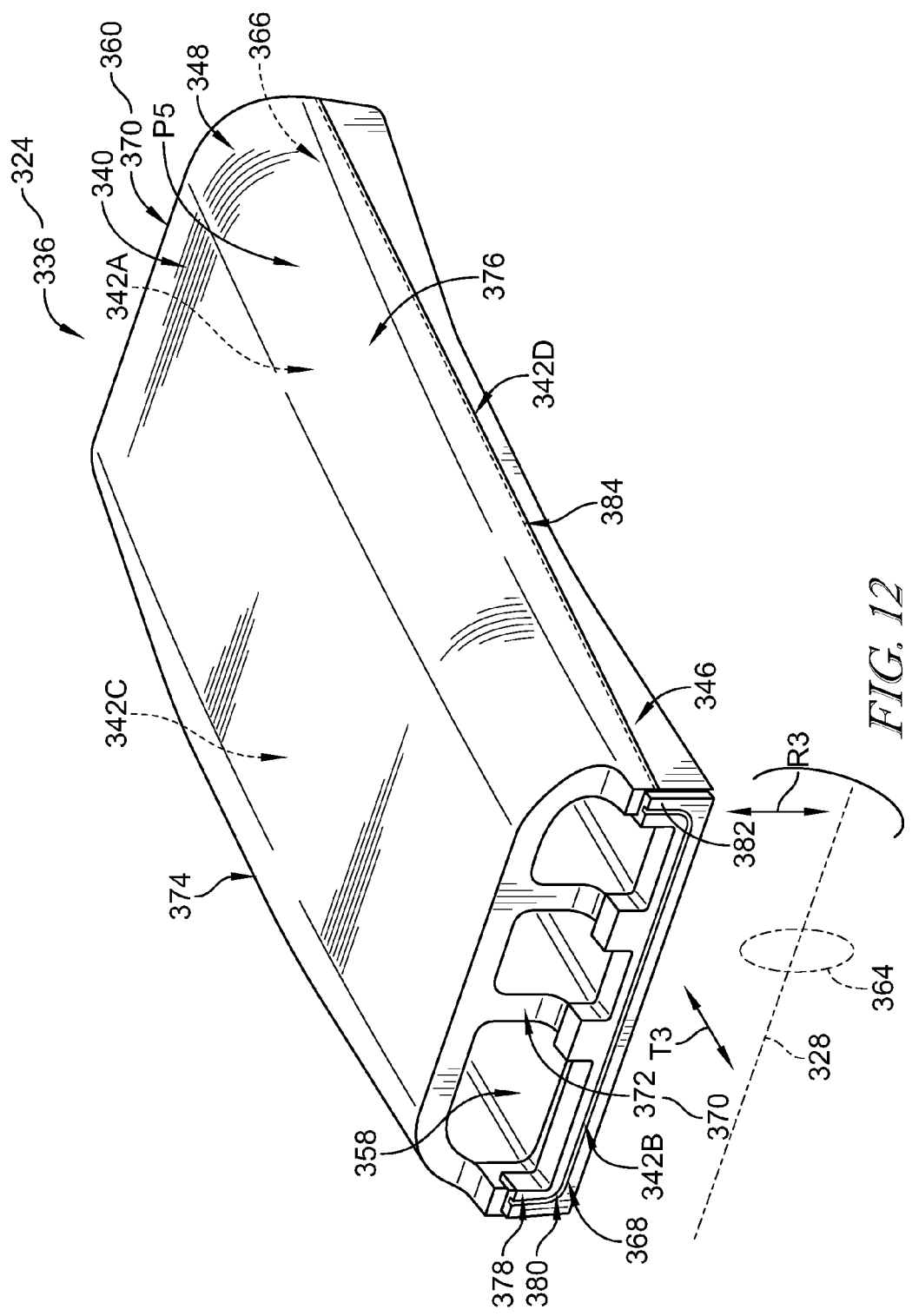
FIG. 12 is a perspective view of yet another still turbine shroud segment adapted for use in the turbine section of FIG. 1 showing that the turbine shroud segment includes a blade track segment or seal ring segment having end pieces and a seal assembly arranged around a perimeter of the blade track segment such that members of the seal assembly are received by the end pieces.

Referring now to FIG. 12, an illustrative turbine shroud segment 336 of a turbine shroud 324 is adapted for use in the turbine 16 of the engine 10. The turbine shroud segment 336 includes a carrier segment (not shown), a blade track segment 340, and a seal assembly 342. The blade track segment 340 illustratively includes ceramic matrix composite materials. The seal assembly 342 illustratively includes metallic materials.

The blade track segment 340 illustratively includes a runner 346 and an attachment box portion 348 as shown in FIG. 12. The runner 346 is shaped to extend partway around a central axis 328 and the attachment box portion 348 may extend outward in a radial direction indicated by arrow R3 from the runner 346 toward an attachment channel formed in the carrier segment. The seal assembly 342 is configured to couple to the carrier segment and the attachment box portion 348 such that the seal assembly 342 seals between the carrier segment and the blade track segment 340. When the seal assembly 342 is coupled to the carrier segment and the attachment box portion 348, the seal assembly 342 seals between the carrier segment and the blade track segment 340 around a perimeter P5 of the blade track segment 340.

The attachment box portion 348 of the blade track segment 340 illustratively extends radially outward from the runner 346 of the segment 340 to define an interior space 358 as shown in FIG. 12. The interior space 358 opens outwardly at opposite circumferential ends 360, 362 of the blade track segment 340 in a tangential direction indicated by arrow T3. The tangential direction T3 is substantially tangent to a circle 364 extending around the central axis 328.

In addition to the runner 346 and the attachment box portion 348, the blade track segment 340 illustratively includes substantially identical end pieces 366, 368 as shown in FIG. 12. The end pieces 366, 368 are engaged with the respective ends 360, 362 of the blade track segment 340. In some embodiments, the end pieces 366, 368 may include metallic materials. In other embodiments, the end pieces 366, 368 may include non-metallic materials, such as ceramic matrix composite materials, for example.

In the illustrative embodiment, the seal assembly 342 includes seal members 342A, 342B, 342C, and 342D as shown in FIG. 12. The seal members 342A, 342B are configured to couple to respective sides 370, 372 of the blade track segment 340 that are arranged opposite one another and extend along the central axis 328. The seal members 342C, 342D are configured to engage respective sides 374, 376 of the blade track segment 340 that are arranged opposite one another and extend between the sides 370, 372.

In the illustrative embodiment, the seal members 342A, 342B are substantially identical to each other and coupled to the sides 370, 372 of the blade track segment 340 by the end pieces 366, 368 in substantially identical fashion as suggested by FIG. 12. As such, only the coupling of the seal member 342B to the side 372 by the end piece 368 is described in greater detail below.

The end piece 368 is illustratively formed to include a groove 378 that is sized to receive the seal member 342B to couple the member 342B to the side 372 of the blade track segment 340 as shown in FIG. 12. When the seal member 342B is received by the groove 378, the seal member 342B extends in the radial direction R3 away from the attachment box portion 348 at opposite ends 380, 382 thereof. Additionally, when the seal member 342B is received by the groove 378, the seal member 342B extends between the ends 380, 382 along the central axis 328.

In the illustrative embodiment, the seal members 342C, 342D are substantially identical to one another and engaged with the sides 374, 376 of the blade track segment 340 in substantially identical fashion as suggested by FIG. 12. As such, only the engagement of the seal member 342D to the side 376 is described in greater detail below.

In the illustrative embodiment, the seal member 342D directly contacts the side 376 of the blade track segment 340 as shown in FIG. 12. In other embodiments, however, the seal member 342D may directly contact a coating 384 that is applied to the side 376 of the segment 340. The coating 384 may applied to the side 376 to provide a smooth engagement surface that may be directly contacted by the seal member 342D.

In the illustrative embodiment, each of the members 342A, 342B interfaces with at least one of the members 342C, 342D as shown in FIG. 12. Specifically, each of the members 342A, 342B interfaces with at least one of the members 342C, 342D such that the members 342A, 342B, 342C, 342D cooperatively extend around the perimeter P5 of the segment 340.

Ceramic Matrix Composites (CMCs) may have very low allowable stress values compared to Ni alloys. Seal segments (or blade tracks) in gas turbine engines may have significant pressure loads. Designing seal segments fabricated from CMC materials with these high pressure loads may be difficult. Additionally, some schemes may seal against CMC structures by loading on a radially oriented flange. This may introduce unacceptably high bending stress in the CMC structure.

By sealing off a cavity (e.g., the cavity 72) above the CMC seal segment (e.g., the seal assembly 42), and/or the cavity (e.g., the interior space 58) inside the CMC seal segment, the pressure loading of the CMC component (e.g., the blade track segment 40) may be better controlled and more easily managed to produce stresses below the allowable stress values of the CMC material and other low strain-to-failure materials. Additionally, by sealing against the sides of the CMC structure (e.g., seal assembly 42 sealing around the perimeter P of the attachment box portion 48), loading may be more compressive in nature (e.g., as indicated by arrows 282) and the bending load of a flange (e.g., the runner 246) may be reduced or eliminated. Furthermore, sealing against the sides of the CMC structure may render the creation of complicated flange geometry unnecessary.

The addition of contoured end caps (e.g., the end caps 166, 168) to the ends (e.g., the ends 160, 162) of the CMC component may allow for a simple means to create a more complicated, 3D CMC structure (e.g., the blade track segment 140). The 'main' CMC component (e.g., the attachment box portion 148), to which the end caps may be added, may be constructed by means of ply layups, instead of more complicated 3D weave technology. The addition of CMC end caps, also fabricated using simpler ply layup methods, may create the desired 3D shape.

With the end caps, a continuous perimeter seal (sealing on component tangential and axial faces) may be established (e.g., sealing around the perimeter P with the seal assembly 42). This seal may provide for the creation of an enclosed cavity (e.g., the cavity 72) above the CMC component (e.g., the blade track segment 40). This cavity may be charged with lower pressure air in order to reduce the loading and stress experienced by the CMC component (e.g., pressurization via the pressure control system 74). Sealing along the perimeter sides of CMC structures may allow for a radially sliding sealing surface (e.g., the sealing surface 270) that accommodates the relative radial displacements commonly found between the adjacent components in gas turbine engines.

The sealing load (e.g., indicated by arrows 282) may be perpendicular to the side faces (tangential and axial faces) of the CMC component (e.g., the blade track segment 240). Normal to these faces (e.g., the structures defining the perimeter P2 of the attachment box portion 248) may be in the direction of one of the structure's best pathways to accept load. Sealing in this fashion may be an advantage over schemes that load in a radial direction (e.g., the radial direction R2) on a flange (e.g., the runner 246) fabricated in the CMC structure. Loading radially on a flange may introduce unacceptable bending stresses in the CMC structure.

A continuous and tangent sealing surface (e.g., the surface 270), created with the addition of the component end caps (e.g., the end caps 266, 268), may allow for the implementation of uninterrupted sealing (i.e. a 'racetrack' metal seal as exemplified by seal assembly 242). A seal of this design may produce the lowest leakage achievable, thereby minimizing or reducing engine specific fuel consumption (SFC).

In some embodiments, relatively straight sections of metal (e.g., the seal members 42A, 42B) may be used to seal around the perimeter of the CMC component. The straight sections of metal may be butt-ended to each other in the corners.

End caps may be comprised either of metallic (such as Nickel alloys) or non-metallic materials. Additionally, end caps may be either mechanically (e.g., via the biaser 88) or chemically joined (e.g., via Chemical Vapor Infiltration (CVI) or Melt Infiltration (MI)) to the 'main' CMC component. In some embodiments, each end cap may be fabricated from two flat pieces of CMC panel material (e.g., the pieces 66A, 66B). The two CMC pieces may be bonded together during the CMC production process or may be mechanically held together.

End caps may leave the interior of the 'main' CMC component open (e.g., the interior space 258) or sealed (e.g., the interior space 58). Should the end caps seal the interior of the 'main' CMC component, there may exist a provision to control the pressure and temperature of the interior of the CMC component independently of other system pressures (e.g., via the system 74). This provision may be used to better control the loads and stresses in the CMC component.

An end treatment (e.g., the coating 384) may be applied to the CMC component (metallic or non-metallic) to accept a strip seal (e.g., a portion of the seal assembly 342), to seal on component tangential faces. In such embodiments, the coating material may be compatible with metal seals and CMC materials subjected to high temperatures and sufficiently resistant to degradation resulting from interaction with the seal. In other embodiments, the CMC component tangential faces may be machined in order to interface with the strip seal.

Elastic metal seals (e.g., 'E' seal) may be designed to work in conjunction with the strip seals to seal on component axial faces. Each elastic seal may be secured in place by an end piece (e.g., the end pieces 366, 368) that directly contacts the axial face. The end piece may include metallic or non-metallic materials. The end piece may be formed to include a groove (e.g., the groove 378) that is designed to receive the elastic metal seal. The elastic metal seals may cooperate with the strip seals to seal around the perimeter of the CMC structure.

Illustrative turbine shroud segments may include metallic carrier segments (e.g., the carrier segment 38) and ceramic-matrix composite blade track segments (e.g., the blade track segment 40) attached thereto. A number of turbine shroud segments (e.g., the turbine shroud segment 36) may be arranged circumferentially adjacent to one another to form a turbine shroud or turbine seal ring (e.g., the turbine shroud 24) for blocking gasses from passing over turbine blades (e.g., the blades 26) in a gas turbine engine without interacting with the turbine blades.

Illustrative turbine shroud segments of the present disclosure may include perimeter seals (e.g., the seal assembly 42) configured to seal between a carrier segment and a blade track segment (seal ring segment) by engaging perimeter sides (e.g., sides 50, 52, 54, 56) of the blade track segment. Such perimeter seals may be annular or segmented and may be pressure activated. Sealing along the perimeter sides of CMC structures allows for a radially sliding sealing surface that accommodates the relative radial displacements that may be found between the adjacent components in gas turbine engines. Additionally, sealing along the perimeter sides of CMC structures may prevent or resist high pressure flowpath gasses (e.g., the gasses from the combustor 14) from leaking into a lower pressure cavity (e.g., the cavity 72) above the CMC structure.

In illustrative embodiments, the blade track segment may include a runner or flange portion (e.g., the runner 46) adapted to extend partway around a bladed wheel and a box portion (e.g., the attachment box portion 48) that extends radially outward from the runner. The perimeter seal(s) may engage the box portion of the blade track segment.

In illustrative embodiments, the blade track segment may include end caps (e.g., the end caps 66, 68) that extend circumferentially from the box portion of the blade track segments and are engaged by the perimeter seal(s). Such end caps may be contoured to provide rounded transitions along perimeter surfaces of a blade track segment.

In illustrative embodiments, the end caps may be made from a ceramic-matrix material. In some such embodiments, the end caps (e.g., the end caps 66, 68) may be co-processed (co-infiltrated) with the box portion of the blade track segment to produce an integral component.

With the end caps, a continuous perimeter seal (sealing on component tangential and axial faces) may be established. This seal may provide for the creation of an enclosed cavity above the CMC component. This cavity may be charged with lower pressure air in order to reduce the loading and stress experienced by the CMC component. In some embodiments, the lower pressure air may be below both a flowpath pressure measured forward of a leading edge of the CMC component (e.g., the leading edge 40L) and a flowpath pressure measured aft of a trailing edge of the CMC component.

Illustrative turbine shroud segments of the present disclosure may provide cooling air flow paths configured to distribute compressor (e.g., from the compressor 12) air into cavities formed between the carrier segment and the blade track segment. Such cooling air flow paths may be distributed by components of an attachment assembly (e.g., the attachment assembly 80) used to couple a blade track segment to a carrier segment.

Illustrative turbine shroud segments of the present disclosure may provide buffer air grooves (e.g., the groove 78) formed in the carrier segments configured to distribute compressor air in order to discourage primary gas path gasses from entering cavities formed between the carrier segment and the blade track segment. The compressor air may represent the greatest pressure supplied to a pressure control system (e.g., the system 74) provided by the turbine shroud segment (e.g., the segment 36).

In some embodiments, turbine shroud segments of the present disclosure may include a single seal segment that seals around only one portion of the perimeter of the CMC blade track segment. In such embodiments, buffer air grooves may be omitted from the carrier segments. Additionally, in such embodiments, the enclosed cavity located above the blade track segment may be pressurized to a pressure above a maximum flowpath pressure located below the blade track segment to prevent the ingress of flowpath gasses into the cavity in the event that the seal segment fails.

Illustrative turbine shroud segments of the present disclosure may include load-distribution springs (e.g., the track biaser 84) for spreading load applied to the blade track segment across the blade track segment. Such load-distribution springs may be coil springs or the like. Such load-distribution springs may be located in cavities formed between the carrier segment and the blade track segment.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud segment comprising
   a carrier segment comprising metallic materials,
   a blade track segment comprising ceramic matrix composite materials, the blade track segment formed to include a runner shaped to extend partway around a central axis and an attachment box portion that extends radially outward from the runner into an attachment channel formed by the carrier segment, and
   a seal assembly configured to couple to the carrier segment and the attachment box portion of the blade track segment such that the seal assembly seals between the carrier segment and the blade track segment around a perimeter of the attachment box portion when the seal assembly is coupled to the carrier segment and the attachment box portion
   wherein the blade track segment includes end caps that cooperate with the attachment box portion of the blade track segment to form a seal surface onto which the seal assembly is engaged.

2. The turbine shroud segment of claim 1, wherein the seal assembly includes at least one unitary component that extends continuously around the perimeter of the attachment box portion.

3. The turbine shroud segment of claim 1, wherein the seal assembly is formed from a plurality of components arranged around the perimeter of the attachment box portion.

4. The turbine shroud segment of claim 3, wherein the seal assembly includes a first seal member configured to couple to the carrier segment and the attachment box portion such that the first seal member seals between the carrier segment and the attachment box portion around a first portion of the perimeter of the attachment box portion and a second seal member configured to couple to the carrier segment and the attachment box portion such that the second seal member seals between the carrier segment and the attachment box portion around a second portion of the perimeter of the attachment box portion located radially outward of the first portion.

5. The turbine shroud segment of claim 4, wherein at least one of the first seal member and the second seal member has a generally E-shaped cross section.

6. The turbine shroud segment of claim 1, wherein each of the end caps is formed from two separate components.

7. The turbine shroud segment of claim 1, wherein the end caps comprise metallic materials.

8. The turbine shroud segment of claim 1, wherein the end caps comprise ceramic matrix composite material.

9. The turbine shroud segment of claim 8, wherein the end caps are integrated with the attachment box portion of the blade track segment by co-processing such that the ceramic matrix composite material bonds the end caps to the attachment box portion.

10. A turbine shroud segment comprising
    a carrier segment comprising metallic materials, the carrier segment formed to include an attachment channel,
    a blade track segment comprising ceramic matrix composite materials, the blade track segment including a runner shaped to extend partway around a central axis, an attachment box portion that extends radially outward from the runner into the attachment channel to define an interior space opening outwardly at opposite ends of the attachment box portion in a direction substantially tangent to a circle extending around the central axis, and end caps engaged with the opposite ends of the attachment box portion to at least partially close off the interior space, and
    a seal assembly configured to couple to the carrier segment, the attachment box portion, and the end caps such that the seal assembly seals between the carrier segment and the attachment box portion and between the carrier segment and the end caps around a perimeter of the attachment box portion when the seal assembly is coupled to the carrier segment, the attachment box portion, and the end caps,
    wherein the end caps are engaged with the opposite ends of the attachment box portion by a biaser that mechanically biases the end caps toward engagement with the opposite ends of the attachment box portion.

11. The turbine shroud segment of claim 10, wherein the biaser is a spring or a rod.

12. The turbine shroud segment of claim 10, wherein the end caps are engaged with the opposite ends of the attachment box portion to define openings into the interior space at the opposite ends of the attachment box portion.

13. A turbine shroud segment comprising:
    a carrier segment comprising metallic materials, the carrier segment formed to include an attachment channel,
    a blade track segment comprising ceramic matrix composite materials, the blade track segment including a runner shaped to extend partway around a central axis, an attachment box portion that extends radially outward from the runner into the attachment channel to define an interior space opening outwardly at opposite ends of the attachment box portion in a direction substantially tangent to a circle extending around the central axis, and end caps engaged with the opposite ends of the attachment box portion to completely close off the interior space,
    a seal assembly configured to couple to the carrier segment, the attachment box portion, and the end caps such that the seal assembly seals between the carrier segment and the attachment box portion and between the carrier segment and the end caps around a perimeter of the attachment box portion when the seal assembly is coupled to the carrier segment, the attachment box portion, and the end caps, and
    a pressure control system configured such that pressure of fluid located in the attachment channel outside of the interior space is controlled independently of pressure of fluid located inside the interior space to adjust the pressure load experienced by the blade track segment during operation of the turbine shroud segment.

14. The turbine shroud segment of claim 13, wherein the end caps comprise metallic materials.

15. The turbine shroud segment of claim 13, wherein the end caps comprise ceramic matrix composite material.

16. The turbine shroud segment of claim 13, wherein the attachment box portion and the end caps interface to cooperatively provide a smooth sealing surface that extends continuously around the perimeter of the attachment box portion and is configured to engage the seal assembly.

17. The turbine shroud segment of claim 16, wherein the seal assembly is configured to apply sealing loads that are applied substantially perpendicular to the sealing surface by the seal assembly and thereby to generally place the blade track segment in compression and reduce torsion of the runner about the central axis when the seal assembly is coupled to the carrier segment, the attachment box portion, and the end caps.

\* \* \* \* \*